(12) United States Patent
Tonegawa et al.

(10) Patent No.: US 9,035,615 B2
(45) Date of Patent: May 19, 2015

(54) ENERGY MANAGEMENT SYSTEM

(75) Inventors: Hiromi Tonegawa, Kounan (JP);
Tetsuhiro Ishikawa, Miyoshi (JP);
Shinji Ichikawa, Toyota (JP); Daisuke Ishii, Toyota (JP); Katsutoshi Murawaka, Kasugai (JP)

(73) Assignees: TOYOTA JIDOSHA KABUSHIKI KAISHA, Toyota (JP); TOYOTA HOUSING CORPORATION, Nagoya (JP)

( * ) Notice: Subject to any disclaimer, the term of this patent is extended or adjusted under 35 U.S.C. 154(b) by 305 days.

(21) Appl. No.: 13/811,481

(22) PCT Filed: Jul. 26, 2011

(86) PCT No.: PCT/IB2011/001723
§ 371 (c)(1),
(2), (4) Date: Mar. 7, 2013

(87) PCT Pub. No.: WO2012/014043
PCT Pub. Date: Feb. 2, 2012

(65) Prior Publication Data
US 2013/0187613 A1 Jul. 25, 2013

(30) Foreign Application Priority Data
Jul. 27, 2010 (JP) ................... 2010-168568

(51) Int. Cl.
*H02J 7/00* (2006.01)
*B60L 11/18* (2006.01)
(Continued)

(52) U.S. Cl.
CPC ............... *H02J 7/00* (2013.01); *B60L 11/1844* (2013.01); *H02J 3/32* (2013.01); *H02J 3/383* (2013.01); *Y02T 10/7088* (2013.01); *Y02T 10/7005* (2013.01); *Y02T 90/163* (2013.01); *Y02E 70/30* (2013.01); *Y02T 90/14* (2013.01); *Y02T 90/128* (2013.01); *Y02E 10/563* (2013.01);
(Continued)

(58) Field of Classification Search
USPC ........................................................ 320/128
See application file for complete search history.

(56) References Cited

U.S. PATENT DOCUMENTS

| | | | |
|---|---|---|---|
| 6,034,507 A | 3/2000 | Ikawa et al. | |
| 6,104,160 A | 8/2000 | Iwata et al. | |
| 7,002,265 B2 * | 2/2006 | Potega | 307/149 |

(Continued)

FOREIGN PATENT DOCUMENTS

| | | |
|---|---|---|
| EP | 1 487 079 A2 | 12/2004 |
| JP | A-5-168160 | 7/1993 |

(Continued)

*Primary Examiner* — Yalkew Fantu
(74) *Attorney, Agent, or Firm* — Oliff PLC

(57) ABSTRACT

An energy management system has an integration control portion that performs control to charge a storage battery with a power of such an amount that a power consumption including a power supplied by a supply portion is equal to or smaller than a target value indicated by power consumption target information recorded in a recording portion when a power consumption detected by a detection portion is smaller than the target value, and to supply a building with a power with which the storage battery is charged such that the power consumption including the power supplied by the supply portion coincides in amount with a power equal to or smaller than the target value indicated by the power consumption target information recorded in the recording portion when the power consumption detected by the detection portion is larger than the target value.

12 Claims, 6 Drawing Sheets

(51) Int. Cl.
*H02J 3/32* (2006.01)
*H02J 3/38* (2006.01)

(52) U.S. Cl.
CPC ............ *Y04S 10/126* (2013.01); *Y02E 60/721* (2013.01); *Y02B 10/14* (2013.01)

(56) References Cited

U.S. PATENT DOCUMENTS

| | | | |
|---|---|---|---|
| 7,994,908 B2 * | 8/2011 | Tonegawa et al. | ............ 340/538 |
| 2004/0228052 A1 | 11/2004 | Hering et al. | |
| 2004/0249516 A1 * | 12/2004 | Seto et al. | ..................... 700/295 |
| 2009/0115252 A1 * | 5/2009 | Caraghiorghiopol et al. | .. 307/48 |
| 2013/0241496 A1 * | 9/2013 | Kurayama | ................... 320/134 |

FOREIGN PATENT DOCUMENTS

| JP | A-10-201129 | 7/1998 |
| JP | A-2001-8380 | 1/2001 |
| JP | A-2005-513484 | 5/2005 |
| JP | A-2006-50838 | 2/2006 |
| JP | A-2006-109621 | 4/2006 |
| JP | A-2006-158146 | 6/2006 |
| JP | A-2009-81936 | 4/2009 |

* cited by examiner

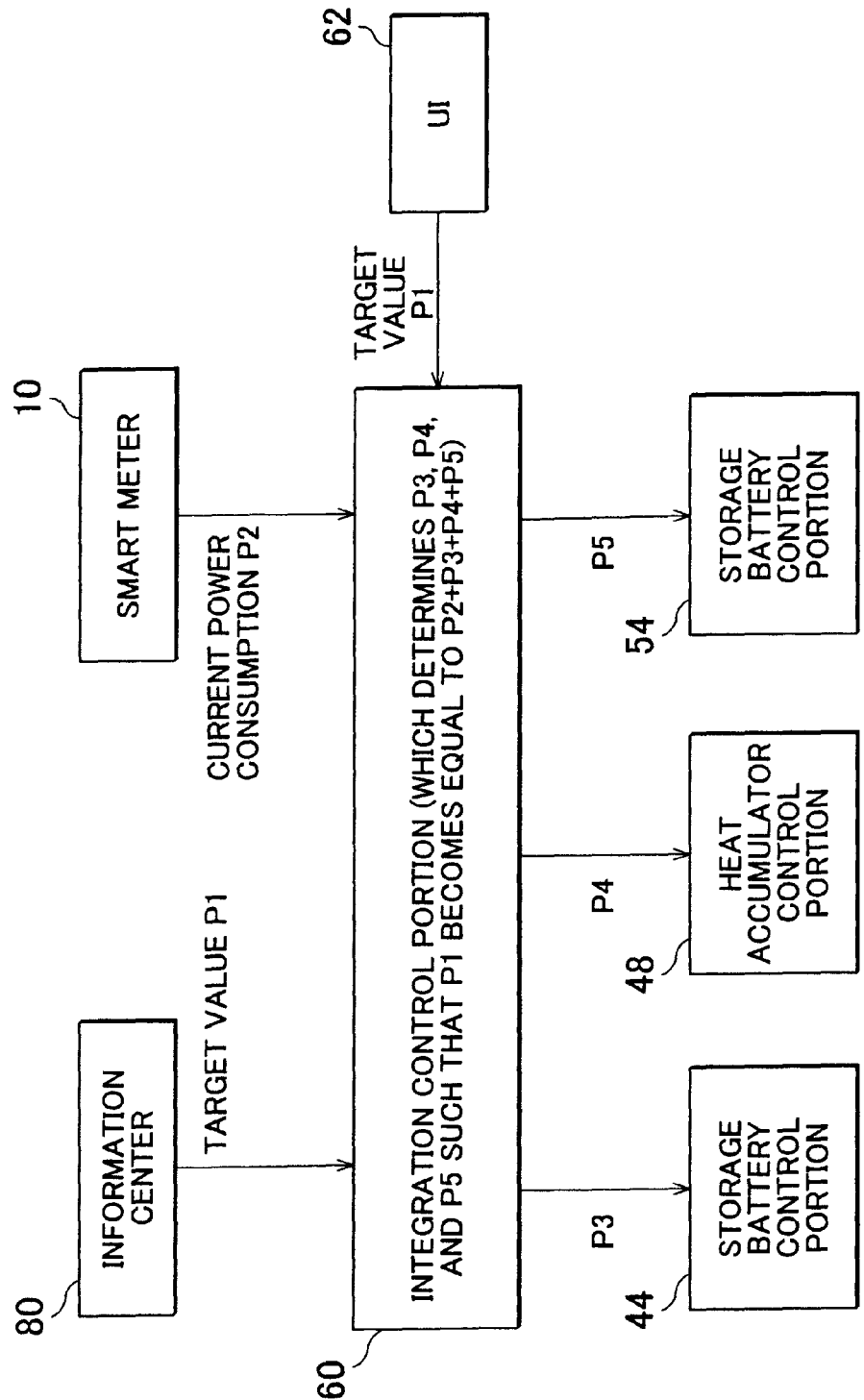

ENERGY MANAGEMENT SYSTEM

BACKGROUND OF THE INVENTION

1. Field of the Invention

The invention relates to an energy management system, and more particularly, to an energy management system for a case where a target value of a power consumption is set.

2. Description of Related Art

In some cases, a power company or the like that supplies power to a building sets a target value of a power consumption of the building. In this case, when the power consumption is controlled to or below the target value, a merit of enabling a reduction in electricity rate or the like is obtained.

In this context, there is disclosed in Japanese Patent Application Publication No. 2006-158146 (JP-A-2006-158146) a power supply management system that maintains a contract type so that a demand does not exceed a contracted level, and makes it possible to offer various services through effective utilization of a system to contribute to an increase in asset values of a complex housing.

Further, there is disclosed in Japanese Patent Application Publication No. 2001-008380 (JP-A-2001-008380) an art of leveling a power demand and ensuring an on-vehicle battery of a predetermined power to make it possible to cope with urgent outing as well in a system capable of transferring power between an electric vehicle and a residence reciprocally.

However, in the art described in Japanese Patent Application Publication No. 2006-158146 (JP-A-2006-158146), although power storage based on midnight power is disclosed, there is a problem in that no sufficient measure is taken to cope with a case where an actual power consumption is smaller than a target value.

Further, in the art disclosed in Japanese Patent Application Publication No. 2001-008380 (JP-A-2001-008380), only the on-vehicle battery is used. As a matter of course, therefore, the power demand can be leveled only when the vehicle is parked close to a building. Further, when inhabitants of the building is away from home in their vehicles, the power consumption is smaller and hence the surplus power tends to be larger than when the inhabitants are at home. That is, from the standpoint of power leveling, the storage of surplus power is desired precisely when the inhabitants are away from home.

As described hitherto, in the related art, there is a problem in that energy management is carried out inefficiently in a building in which a target value of a power consumption is set.

SUMMARY OF THE INVENTION

The invention provides an energy management system that makes it possible to efficiently carry out energy management in a building in which a target value of a power consumption is set.

A first aspect of the invention relates to an energy management system. This system has a storage battery, a recording portion in which power consumption target information indicating a target value in consuming a power supplied by a supply portion that supplies a power to a building is recorded, a detection portion that detects a current power consumption in the building, and an integration control portion that performs control to charge the storage battery with a power of such an amount that the power consumed that is supplied from the supply portion is equal to or smaller than the target value when the power consumption detected by the detection portion is smaller than the target value indicated by the power consumption target information recorded in the recording portion, and to supply the building with the power with which the storage battery is charged such that the power consumed that is supplied from the supply portion is equal to or smaller than the target value when the power consumption detected by the detection portion is larger than the target value indicated by the power consumption target information recorded in the recording portion.

According to this system, the power consumption target information indicating the target value in consuming the power supplied by the supply portion that supplies the power to the building is recorded in the recording portion, and the current power consumption in the building is detected by the detection portion.

The integration control portion performs control to charge the storage battery with the power of such an amount that the power consumption including the power supplied by the supply portion is equal to or smaller than the target value when the power consumption detected by the detection portion is smaller than the target value indicated by the power consumption target information recorded in the recording portion, and to supply the building with the power with which the storage battery is charged such that the power consumption including the power supplied by the supply portion coincides in amount with the power equal to or smaller than the target value when the power consumption detected by the detection portion is larger than the target value indicated by the power consumption target information recorded in the recording portion. Therefore, in the building in which the target value of the power consumption is set, energy management can be carried out efficiently.

The energy management system may have a plurality of storage battery control portions that control charge and discharge of a plurality of the storage batteries respectively. Each of the storage battery control portions may control charge and discharge of a corresponding one of the storage batteries in accordance with a command issued by the integration control portion.

According to this system, the integration control portion performs control for each of the storage battery control portions. Therefore, energy management can be carried out integrally.

Further, each of the storage battery control portions may control discharge of a corresponding one of the storage batteries such that a power discharged therefrom becomes equal to or smaller than a predetermined amount of power.

According to this system, in the case where it is advisable to ensure, for example, an electric vehicle or the like of a certain amount of power, the control is performed such that the discharged power becomes equal to or smaller than the predetermined power. It thereby becomes possible to cope also with a case where the electric vehicle is used for reasons of urgency.

Further, the predetermined amount of power may be specified by the integration control portion. According to this system, energy management can be carried out integrally.

Further, the integration control portion may determine in advance ranks of the storage batteries intended for discharge in causing the storage batteries to discharge power, and determine, in accordance with the amount of the power supplied to the building and the ranks, those storage batteries intended for discharge.

According to this system, in the case where it is advisable to ensure, for example, an electric vehicle or the like of a certain amount of power, the ranks are determined. It thereby becomes possible to cope also with a case where the electric vehicle is used for reasons of urgency.

Further, the storage batteries may be either stationary storage batteries arranged in or close to the building or mobile storage batteries provided in a vehicle to be used to cause the vehicle to run.

According to this system, the storage batteries may be either stationary storage batteries arranged in or close to the building or mobile storage batteries provided in the vehicle to be used to cause the vehicle to run.

The integration control portion may cause each of the storage batteries intended for discharge to discharge power such that a predetermined amount of a stored power needed to cause the vehicle to run is left, when that storage battery intended for discharge is provided in the vehicle.

According to this system, in the case where it is advisable to ensure, for example, an electric vehicle or the like of a certain amount of power, a predetermined amount of the stored power is left for each of those storage batteries. It thereby becomes possible to cope also with a case where the electric vehicle is used for reasons of urgency.

The predetermined storage amount may be determined in accordance with the vehicle. According to this system, it is possible to cope with the replacement of the vehicle by purchase.

The ranks of the mobile storage batteries may correspond to earlier discharge than the ranks of the stationary storage batteries.

According to this system, in the case of a vehicle that does not always require the storage of power in storage batteries in order to run without any problem, for example, in the case of a plug-in hybrid vehicle, when the vehicle has left the building, there tend to be a power remaining in each of the stationary storage batteries. Therefore, energy management can be carried out efficiently.

The energy management system may further have a setting portion that sets the target value, and the setting portion may set a target value indicated by a power supplier where the supply portion supplies the building with power, or a target value input by a user.

According to this system, it is possible to set the target value indicated by the power supplier, or the target value input by the user.

The aforementioned system may further have a heat accumulation portion that generates heat through power and accumulates the generated heat. The integration control portion may perform control to supply the heat accumulation portion with a power of such an amount that the power consumption including the power supplied by the supply portion is equal to or smaller than the target value, when the power consumption detected by the detection portion is smaller than the target value indicated by the power consumption target information recorded in the recording portion.

According to this system, heat is generated through power, and the heat accumulation portion that accumulates the generated heat can also be supplied with power. Energy management can thereby be carried out efficiently.

The energy management system may further have a power generation portion that generates a power in the building to supply the building with the power as well as the power supplied by the supply portion.

According to this system, the power generation portion that generates a power in the building to supply the building with the power is further provided. Energy management can thereby be carried out efficiently.

The integration control portion may control the power used to charge each of the storage batteries such that higher priority is given to the power supplied by the power generation portion than to the power supplied by the supply portion.

According to this system, the control is so performed as to give priority to the power supplied by the power generation portion. The amount of consumption of the power supplied from the supply portion can thereby be reduced.

The integration control portion may perform control to sell the power with which each of the storage batteries is charged.

According to this system, the electricity rate can be reduced by selling the power with which each of the storage batteries is charged.

A second aspect of the invention relates to a method of controlling an energy management system. This system is equipped with a storage battery and a supply portion that supplies a building with power. The method of controlling this system includes recording power consumption target information indicating a target value in consuming a power supplied from the supply portion, detecting a power consumption in the building, performing control to charge the storage battery with a power of such an amount that the power consumed that is supplied from the supply portion is equal to or smaller than the target value, when the detected power consumption is smaller than the target value indicated by the recorded power consumption target information, and performing control to supply the building with the power with which the storage battery is charged such that the power consumed that is supplied from the supply portion is equal to or smaller than the target value, when the detected power consumption is larger than the target value indicated by the recorded power consumption target information.

The system and the method of controlling the same according to the invention make it possible to efficiently carry out energy management in a building in which a target value of a power consumption is set.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein:

FIG. 2 is a view showing pieces of information sent and received among a smart meter, storage battery control portions, a heat accumulator control portion, and an integration control portion;

DETAILED DESCRIPTION OF EMBODIMENT

An embodiment of the invention will be described hereinafter in detail with reference to the drawings.

Figure 1:
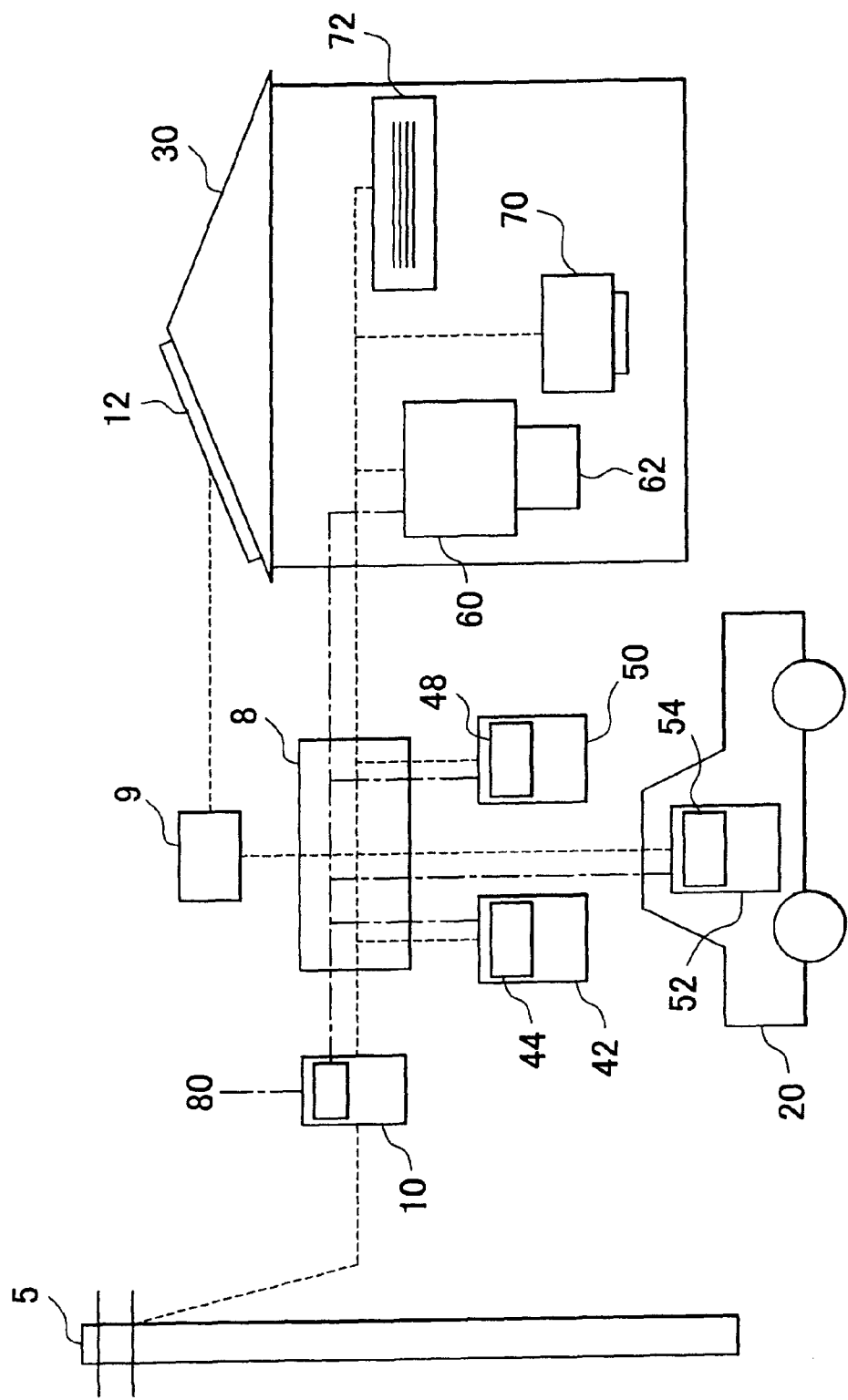
FIG. 1 is a view showing a configurational example of an energy management system.

FIG. 1 is a view showing a configuration including an energy management system according to the invention. In FIG. 1, a telegraph pole 5, a smart meter 10, a distribution board 8, a building 30, a solar battery 12, a power conditioner 9, storage batteries 42 and 52, storage battery control portions 44 and 54, a heat accumulator control portion 48, a heat accumulator 50, an integration control portion 60, a UI 62, a television set 70, a cooler 72, an information center 80, and a vehicle 20 are shown.

It should be noted in FIG. 1 that broken lines indicate electric wires through which power is supplied, and alternate long and short dash broken lines indicate cables for establishing communication or logical channels in the case of radio transmission. Accordingly, the smart meter 10, the storage battery control portions 44 and 54, the heat accumulator control portion 48, the distribution board 8, and the integration control portion 60 can communicate with one another.

In FIG. 1, the telegraph pole 5, which serves as a supply portion that supplies a building with power, supplies systematic power, which is supplied to the building 30. The smart meter 10 is provided between the telegraph pole 5 and the building 30, and has the functions of measuring an amount of electricity usage, communicating with other instruments, and the like. Especially in this embodiment of the invention, the smart meter 10 functions as a detection portion that detects a current power consumption in a building. Further, the smart meter 10 acquires power consumption target information, which indicates a target value (a value at the time when power supplied from the telegraph pole 5 is consumed) indicated by an information center 80 provided on a power supplier where power is supplied to the building 30 by the telegraph pole 5, through communication with the information center 80. The power consumption target information is transmitted to the integration control portion 60. It should be noted that although the smart meter 10 is described as communicating with the information center 80 to transmit the power consumption target information to the integration control portion 60 in this embodiment of the invention, the integration control portion 60 may directly communicate with the information center 80.

The distribution board 8 distributes electricity. In this embodiment of the invention, the distribution board 8 distributes the power supplied from the telegraph pole 5 and the power from the solar battery 12 to the storage batteries 42 and 52, the heat accumulator 50, the integration control portion 60, and domestic electric appliances, namely, the television set 70 and the cooler 72. Further, the distribution board 8 measures an amount of power usage in each branch, and transmits the measured amount to the integration control portion 60. It should be noted that although the current power consumption in the building can be detected by the smart meter 10 or the distribution board 8 in this embodiment of the invention, only one of the smart meter 10 and the distribution board 8 may be used to detect the current power consumption in the building. However, while only the power consumption in the entire building 30 is known from the smart meter 10, the power consumption in each branch is known from the distribution board 8.

Out of the plurality of the storage batteries 42 and 52, the storage battery 42 is a stationary storage battery arranged in or close to the building, and the storage battery 52 is a mobile storage battery provided in the vehicle 20 to be used to cause the vehicle 20 to run.

Further, each of the storage battery control portions 44 and 54 controls the charge and discharge of a corresponding one of the plurality of the storage batteries 42 and 52. Each of the storage battery control portions 44 and 54 controls the charge and discharge of a corresponding one of the storage batteries 42 and 52 in accordance with a command issued by the integration control portion 60.

The solar battery 12, which serves as a power generation portion that makes it possible to supply a building with power through the provision of a power generation installation in the building, converts light energy into power, which is supplied to the distribution board 8 via the power conditioner 9 that controls the power from the solar battery 12. As a result, the building 30 can also be supplied with the power from the solar battery 12.

The heat accumulator 50 is a heat accumulation portion that generates heat through power and accumulates the generated heat. More specifically, the heat accumulator 50 accumulates heat by, for example, turning cold water into hot water. This heat accumulator 50 is also provided with the heat accumulator control portion 48.

The integration control portion 60 is composed of a central processing unit (a CPU), a random access memory (a RAM), a read only memory (a ROM), and the like. Further, the integration control portion 60 integrally controls the storage battery control portions 44 and 54 and the heat accumulator control portion 48. Among those components, the ROM is a rewritable flash memory or the like, serving as a recording portion in which power consumption target information indicating a target value in consuming a power supplied by the telegraph pole 5 is recorded. The target value indicated by this power consumption target information may differ depending on the period or time zone.

The integration control portion 60 according to this embodiment of the invention performs control to charge the storage batteries 42 and 52 with a power of such an amount that the power consumption including the power supplied by the telegraph pole 5 is equal to or smaller than the target value when the power consumption detected by the smart meter 10 or the distribution board 8 is smaller than the target value indicated by the power consumption target information recorded in the ROM, and to supply the building with the power with which the storage batteries 42 and 52 are charged such that the power consumption including the power supplied by the telegraph pole 5 coincides in amount with a power equal to or smaller than the target value when the power consumption detected by the smart meter 10 or the distribution board 8 is larger than the target value indicated by the power consumption target information recorded in the ROM.

Furthermore, the integration control portion 60 performs control to supply the heat accumulator 50 with a power of such an amount that the power consumption including the power supplied by the telegraph pole 5 is equal to or smaller than the target value, when the power consumption detected by the smart meter 10 or the distribution board 8 is smaller than the target value indicated by the power consumption target information recorded in the ROM.

The UI 62 is a user interface in the integration control portion 60. Especially in this embodiment of the invention, a user inputs a target value to the UI 62. The integration control portion 60 further has a setting portion that sets a target value. This setting portion sets a target value indicated by the power supplier where the telegraph pole 5 supplies the building 30 with power (a target value acquired by the aforementioned smart meter 10 from the information center 80), or sets a target value input to the UI 62 by the user.

The television set 70 and the cooler 72 are mentioned as examples of things consuming power in the building 30, and the invention should obviously not be limited to such examples. Further, although the two storage batteries and the single heat accumulator are shown in FIG. 1, the number of storage batteries or heat accumulators should not be limited to any specific number. In addition, the smart meter 10, the distribution board 8, and the power conditioner 9 are illustrated away from the building 30 to facilitate the understanding of the description. These components are usually attached to the building 30.

Further, although the storage battery 42 and the heat accumulator 50 are illustrated outside the building 30, it does not matter whether these components are installed outside or inside the building 30.

Next, pieces of information sent and received among the smart meter 10, the storage battery control portions 44 and 54, the heat accumulator control portion 48, and the integration control portion 60 will be described using FIG. 2.

In FIG. 2, the smart meter 10, the storage battery control portions 44 and 54, the heat accumulator control portion 48, the integration control portion 60, and the UI 62 are shown. First of all, the power consumption target information indicating a target value P1 in consuming a power supplied by the telegraph pole 5 is input to the integration control portion 60 via the smart meter 10 by the information center 80 or the UI 62. This target value P1 is recorded in the ROM as described above.

On the other hand, a current power consumption P2 is input to the integration control portion 60 from the smart meter 10 or the distribution board 8. When P1>P2, namely, when the power consumption P2 detected by the smart meter 10 or the distribution board 8 is smaller than the target value P1 indicated by the power consumption target information recorded in the ROM, the integration control portion 60 determines P3, P4, and P5 such that P1 becomes equal to P2+P3+P4+P5. It should be noted herein that P3 denotes a power used by the storage battery control portion 44 for charge. Further, P4 denotes a power used by the heat accumulator control portion 48 for heat storage. Furthermore, P5 denotes a power used by the storage battery control portion 54 for charge. The storage battery control portions 44 and 54 and the heat accumulator control portion 48 perform control such that charge or heat storage is carried out at values (p3, p4, p5) smaller than P3, P4, and P5 respectively. A relationship: P1>P2+p3+p4+p5 is thereby established, and at least the target value is not reached or exceeded.

On the other hand, when P1<P2, namely, when the power consumption P2 detected by the smart meter 10 or the distribution board 8 is larger than the target value P indicated by the power consumption target information recorded in the ROM, the integration control portion 60 determines P3 and P5 such that P1 becomes equal to P2+P3+P5. It should be noted, however, that P3 and P5 are indicated with a negative sign. That is, the amount of the power used for charge is indicated with a positive sign, and the amount of the discharged power is indicated with a negative sign.

Accordingly, when P1<P2, the absolute value of P3 indicates the power discharged by the storage battery control portion 44. Further, the absolute value of P5 indicates the power discharged by the storage battery control portion 54. It should be noted that since a heat accumulation portion 50 does not have the function of discharge, the integration control portion 60 issues no command to the heat accumulator control portion 48 when P1<P2.

In this manner, each of the storage battery control portions 44 and 54 controls the charge and discharge of a corresponding one of the storage batteries 42 and 52 in accordance with a command issued by the integration control portion 60.

Further, each of the storage battery control portions 44 and 54 controls the discharge of a corresponding one of the storage batteries 42 and 52 such that the power discharged by the corresponding one of the storage batteries 42 and 52 becomes equal to or smaller than a predetermined power. In this case, as described above, the predetermined power is specified by the integration control portion 60.

Furthermore, the integration control portion 60 may determine in advance the ranks of the storage batteries intended for discharge in causing the storage batteries 42 and 52 to discharge power, and determine the storage batteries intended for discharge in accordance with the amount of the power supplied to the building 30 and the ranks.

More specifically, for example, the ranks of the storage battery 42 and the storage battery 52 are determined as the first rank and the second rank respectively. The control is performed such that power is first discharged only from the storage battery 42 when the power to be discharged can be sufficiently covered only by the storage battery 42, and that power is discharged from the storage battery 52 when more power is required.

However, when the storage battery intended for discharge is the storage battery 52 provided in the vehicle 20, the integration control portion 60 may discharge power from the storage battery 52 such that a predetermined amount of power storage needed to cause the vehicle 20 to run is left. In this case, the predetermined amount of power storage needed to cause the vehicle to run often differs depending on the type of the vehicle, and therefore may be determined in accordance with the type of the vehicle with the aid of the UI 62. It should be noted that the power storage amount of the storage battery 52 is transmitted from the storage battery control portion 44 to the integration control portion 60. Thus, no trouble occurs in causing the vehicle 20 to run, and the replacement of the vehicle by purchase can also be coped with.

Further, in the case of a vehicle that runs without any problem even when no power is stored in a storage battery, for example, a plug-in hybrid vehicle, it is also appropriate to determine the ranks of the storage battery 42 and the storage battery 52 as the second rank and the first rank respectively. That is, the rank of the mobile storage battery may correspond to earlier discharge than the rank of the stationary storage battery. Thus, when the vehicle 20 has left the building 30, there tends to be power remaining in the storage battery 42. Therefore, energy management can be carried out efficiently.

Next, the contents of the control performed by the integration control portion 60 according to this embodiment of the invention will be described using FIGS. 3A and 3B. In each of FIG. 3A and FIG. 3B, an axis of ordinate represents power, and an axis of abscissa represents time. Further, broken lines indicate a target value, and each bar of a bar chart indicates a power consumption at a corresponding time.

Figure 3A:
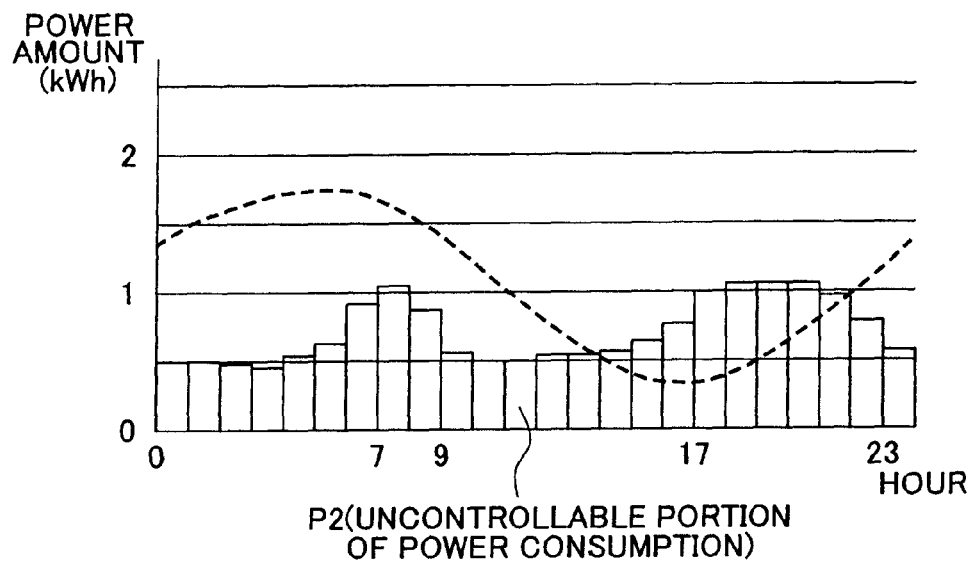
FIGS. 3A and 3B are views showing contents of control performed by the integration control portion.

FIG. 3A is a graph showing a state in which this embodiment of the invention is not applied. The graph of FIG. 3A shows that the power consumed by the television set 70 or the cooler 72 becomes smaller or larger than the target value.

Figure 3B:
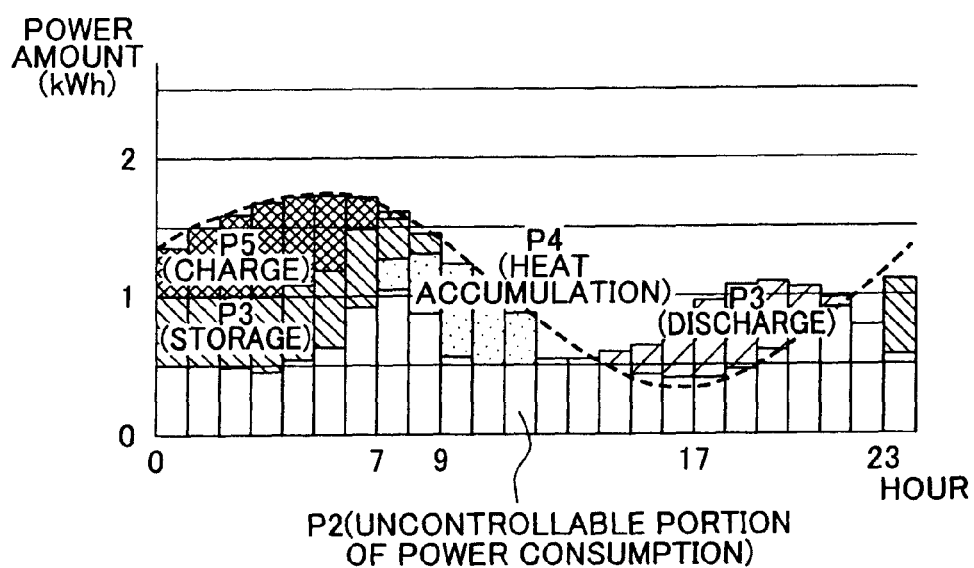

FIG. 3B is a graph showing a state in which this embodiment of the invention is applied. As shown in FIG. 3B, when the power consumption indicated in the form of a bar chart is smaller than the target value, the control is performed to charge the storage batteries 42 and 52 (P3 and P5) or accumulate heat in the heat accumulator 50 (P4) with a power of such an amount that the power consumption including the power supplied from the telegraph pole 5 is equal to or smaller than the target value. When the power consumption is larger than the target value, the control is performed to supply the building with the power with which the storage battery 42 (P3) is charged such that the power consumption including the power supplied by the telegraph pole 5 coincides in amount with a power equal to or smaller than the target value.

Next, the contents of the control performed by the integration control portion 60 in the case where the vehicle 20 is a plug-in hybrid (PHV) vehicle will be described using FIGS. 4A and 4B. In each of FIGS. 4A and 4B, an axis of ordinate represents power, and an axis of abscissa represents time. Further, broken lines indicate a target value, and each bar of a bar chart indicates a power consumption at a corresponding time. It is also indicated that a scheduled time for utilizing the PHV vehicle (staying away from the building) is 7 o'clock to 21 o'clock of the same day in the case of FIG. 4A, and is 3 o'clock to 17 o'clock of the same day in the case of FIG. 4B.

Figure 4A:
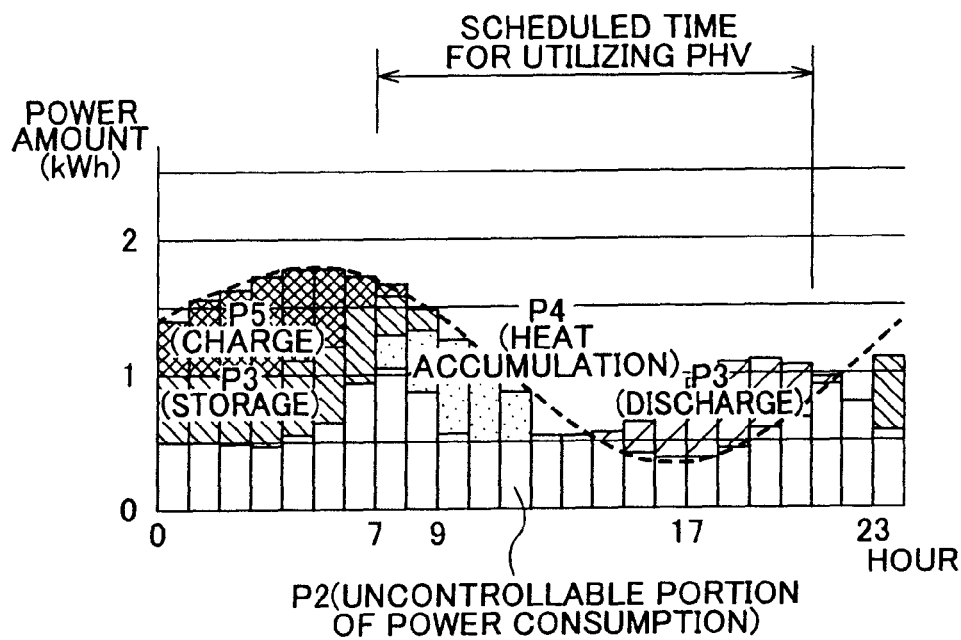
FIGS. 4A and 4B are views showing contents of control performed by the integration control portion in a case of a PHV vehicle.
Figure 4B:
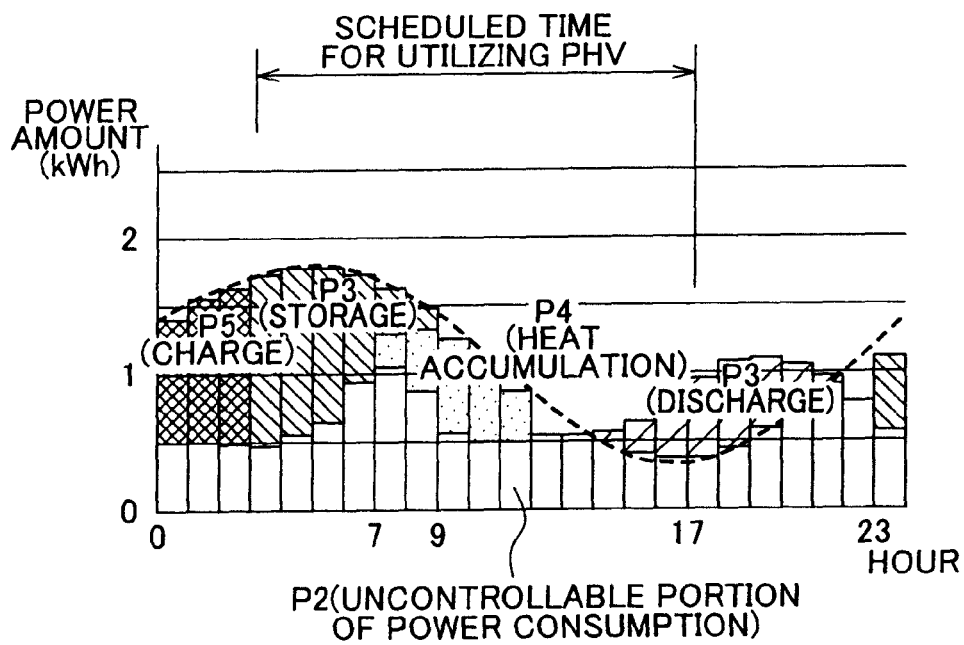

That is, in terms of time, the building is left earlier in FIG. 4B than in FIG. 4A. Accordingly, since there is enough time in the case of FIG. 4A, the control is performed such that the storage batteries 42 and 52 (P3 and P5) are simultaneously charged, that heat is accumulated in the heat accumulator 50 (P4) after the completion of the charge of the storage batteries 42 and 52 (P3 and P5), and that power is discharged from the storage battery 42 (P3) in a time zone in which the vehicle 20 is away from the building. It should be noted that it is possible to determine whether or not the vehicle 20 is away from the building, depending on whether there is an electric connection with the vehicle 20 (whether or not a power dispatching connector and a power receiving connector of the vehicle are connected to each other).

On the other hand, since there is not enough time in the case of FIG. 4B, the control is performed such that the storage battery 52 (P5) of the vehicle is first charged, that the storage battery 42 (P3) is charged after the completion of the charge of the storage battery 52 (P5), that heat is then accumulated in the heat accumulator 50 (P4), and that power is discharged from the storage battery 42 (P3) in a time zone in which the vehicle 20 is away from the building.

As described hitherto, in the case where the time zone in which the vehicle 20 is away from the building is known in advance, the storage battery 52 of the vehicle 20 may be charged by priority in accordance with the time zone.

It should be noted that FIGS. 4A and 4B illustrate the case of the PHV vehicle, but obviously, are also applicable to the case of an electric vehicle (EV). Further, as regards the time zone in which the building has been left, the integration control portion 60 may store into the ROM data on the date, hour, day of the week and the like when the building is left, and estimate the time zone on the basis of these data. In this case, energy management can be carried out more efficiently by storing a remaining power storage amount at a time when the vehicle 20 returns to the building.

Next, the contents of the control performed by the integration control portion 60 in the case where a power generation amount of the solar battery 12 is used will be described using FIGS. 5A to 5D. In each of FIGS. 5A to 5D, an axis of ordinate represents power, and an axis of abscissa represents time. Further, broken lines indicate a target value, and each bar of a bar chart indicates a power consumption at a corresponding time. Furthermore, lines more finely broken than the broken lines indicating the target value indicate an amount of a power generated by the solar battery 12.

Figure 5A:
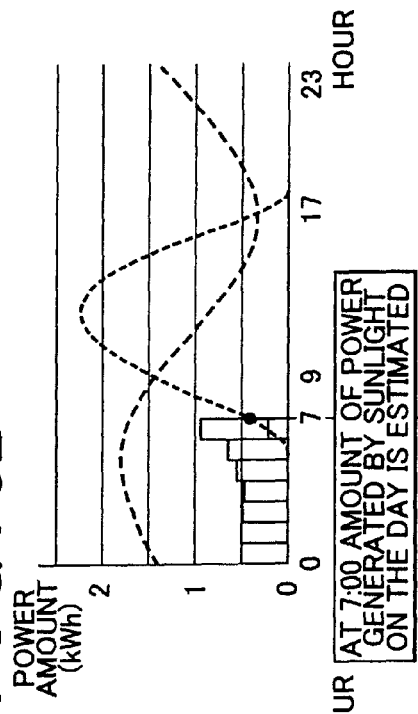
FIGS. 5A to 5D are views showing contents of control performed by the integration control portion in a case where a power generation amount of a solar battery is used.

FIG. 5A is a graph showing a state in which this embodiment of the invention is not applied. This graph shows that the power consumed by the television set 70 and the cooler 72 becomes smaller or larger than the target value.

Figure 5B:
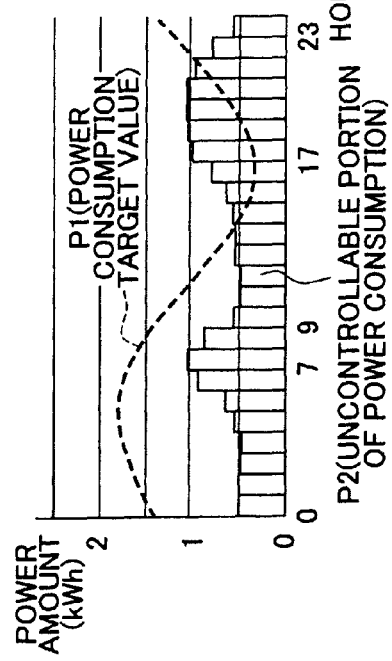

In FIG. 5B, an amount of a power generated by the solar battery 12 with the aid of sunlight for a day is estimated at 7 o'clock a.m. of the day. This estimation can be made in accordance with a sunshine duration acquired from, for example, a weather forecast of the day.

Figure 5C:
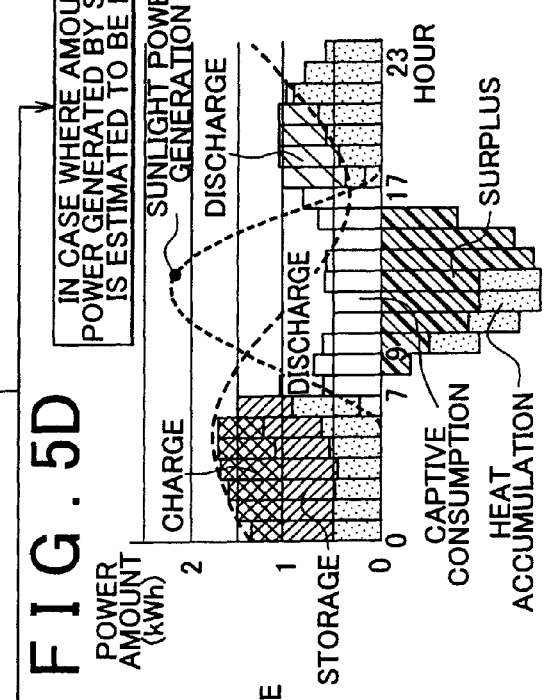

After this estimation has been made, the control is performed differently depending on whether the power generation amount of the solar battery 12 is larger or smaller than a predetermined threshold. FIG. 5C shows the contents of the control in the case where the power generation amount is smaller than the predetermined threshold (the power generation amount is zero or small), and FIG. 5D shows the contents of the control in the case where the power generation amount is larger than the predetermined threshold (the power generation amount is large).

Figure 5D:
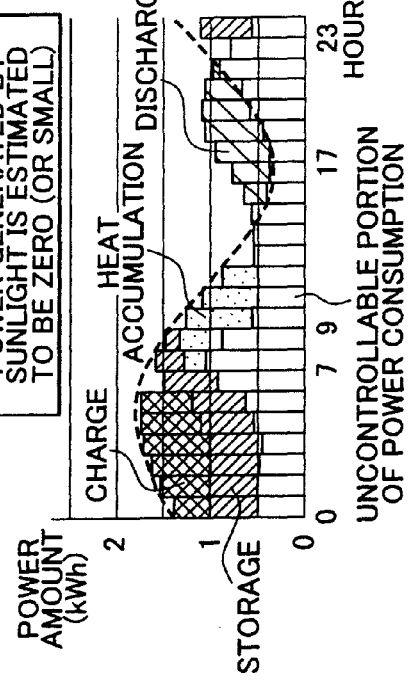

In FIGS. 5C and 5D, charge and power storage are carried out in the same manner until the time for making an estimation (7 o'clock). Then, when the power generation amount is smaller than the predetermined threshold, power is discharged from the storage battery 42 or the storage battery 52 as shown in FIG. 5C.

On the other hand, when the power generation amount is larger than the predetermined threshold, the power supplied from the solar battery 12 is consumed as shown in FIG. 5D (from 6 o'clock to 18 o'clock of the same day in FIG. 5D). Then, since the amount of the power generated from the solar battery 12 is larger than the power consumption, it is also appropriate to perform the control to further accumulate heat in the heat accumulator 50 and, for example, sell a surplus of the power.

Further, as shown in FIG. 5D, the integration control portion 60 may control the power used to charge the storage batteries 42 and 52 and also the power supplied to the heat accumulator 50, such that higher priority is given to the power supplied by the solar battery 12 than to the power supplied by the telegraph pole 5.

As described above, when the amount of the power generated by the solar battery 12 is larger than the power consumption to generate a surplus of power, this power may be sold.

In the case where, for example, the amount of the power stored in the storage batteries as well as the amount of the power generated by the solar battery 12 is sufficient and larger than the power consumption even after discharge so that a surplus of power is additionally generated, it is also appropriate to perform the control to sell the power with which the storage batteries are charged.

Figure 6:
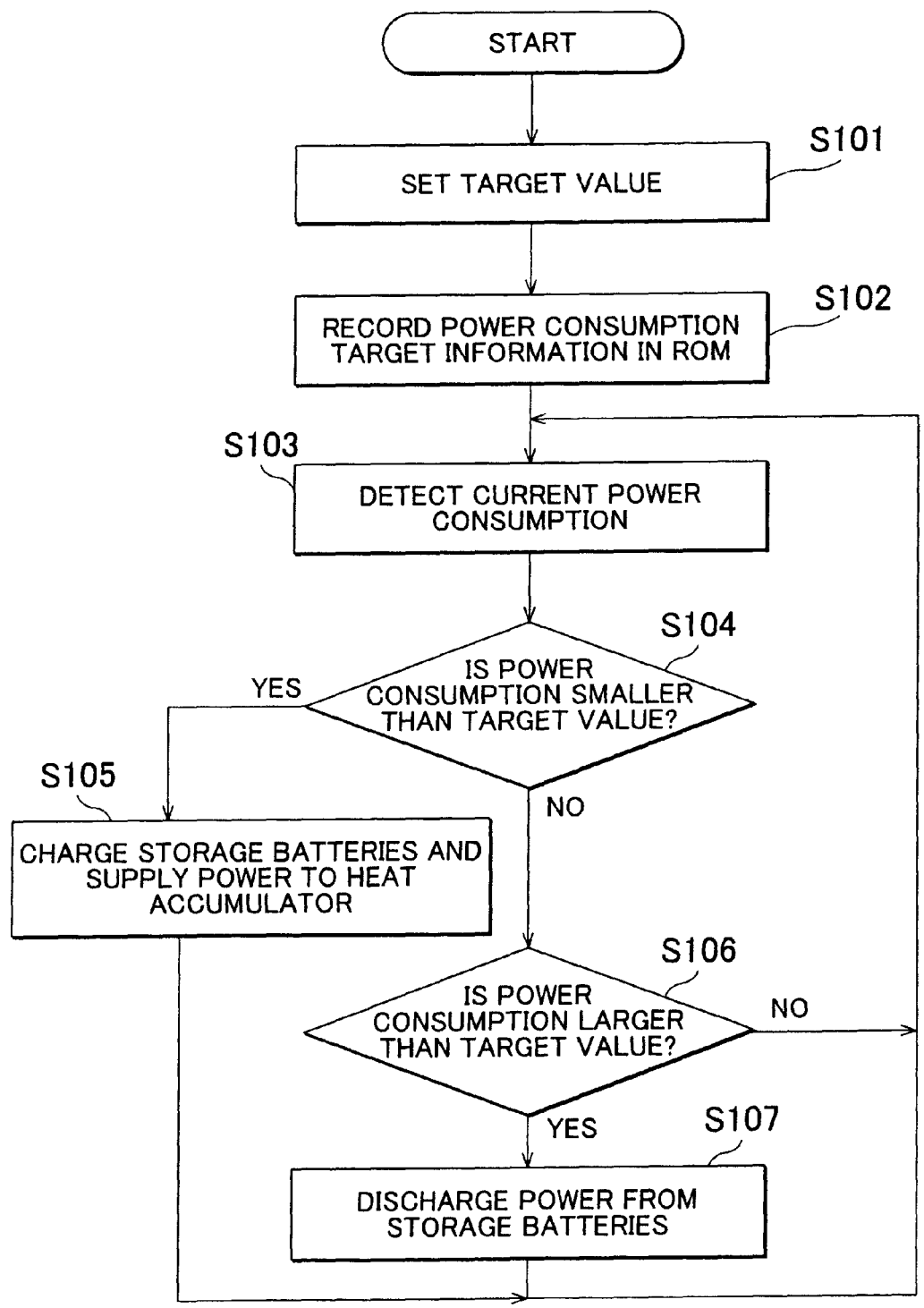
FIG. 6 is a flowchart showing the flow of a processing performed by the integration control portion.

The flow of the above-described processing performed by the integration control portion 60 will be described using the flowchart of FIG. 6. First of all, a target value is set in step 101. As described above, this target value is either a target value indicated by the power supplier or a target value input to the UI 62 by the user.

Subsequently in step 102, power consumption target information indicating the target value is recorded in the ROM. In step 103, a current power consumption in the building 30 is detected by the smart meter 10 or the distribution board 8. This is a basis operation of the smart meter 10 or the distribution board 8, and this detected power consumption is transmitted to the integration control portion 60.

The integration control portion 60 determines in step 104 whether or not the power consumption is smaller than the target value indicated by the power consumption target information recorded in the ROM. When a positive determination is made in this step 104, the control is performed to store power into the storage batteries 42 and 52 or supply power to the heat accumulator 50 in step 105, and a return to the processing stage of step 103 is made. It should be noted that when one of the storage batteries (e.g., the storage battery 52 of the vehicle 20) is charged by priority, the control is performed in such a manner as described above.

On the other hand, when a negative determination is made in step 104, it is determined in step 106 whether or not the power consumption is larger than the target value indicated by the power consumption target information recorded in the ROM. When a negative determination is made in this step 106, a return to the processing stage of step 103 is made. When a positive determination is made in this step 106, the control is performed to discharge power from the storage batteries 42 and 52 in step 107, and a return to the processing stage of step 103 is made. It should be noted that when power is discharged from one of the storage batteries (e.g., the storage battery 52 of the vehicle 20) by priority, the control is performed in such a manner as described above.

In the flow of this processing, when the resetting or the like of the target value is carried out by the user, a message is emitted from a thread for controlling the UI 62, and a processing concerning the setting is thereby activated as interruption handling. Further, in the case where the control is stopped or terminated as well, the processing shown in FIG. 6 is stopped or terminated in response to the reception of a message indicating stop or termination likewise.

In the control of the foregoing embodiment of the invention, the target value is strictly observed. However, the control may be flexibly performed depending on the inhabitants of the building 30. To be more specific, items such as comfort, economical efficiency, the saving of $CO_2$ and the like are set, the levels of importance of these items are made settable by the inhabitants, and the control is performed in accordance with the contents of the setting.

For example, the level of importance is made settable between 0% (the target is ignored and priority is given to comfort) and 100% (the target is strictly observed and comfort is ignored), and the control is performed in accordance with the set percentage. For example, when the set percentage is 70%, 30% of the power to be used intrinsically for the charge of the storage battery 42 or heat accumulation is delivered to the cooler 72.

This setting may be made possible by, for example, each of the inhabitants. In this case, the contents of the setting are stored in the ROM of the integration control portion 60 in the form of a table, and besides, the authentication of users is carried out by the UI 62, an electronic key, or the like. Referring to a result of the authentication, the integration control portion 60 acquires the contents of the setting corresponding to each authenticated inhabitant from the table stored in the ROM, and performs the control. It should be noted that degrees of priority may be determined individually for a plurality of inhabitants in case they are at home at the same time. The integration control portion 60 performs the control on the basis of the contents of the setting corresponding to that one of the inhabitants at home which has the highest degree of priority.

Needless to say, the flow of the processing of the flowchart (FIG. 6) described in the foregoing embodiment of the invention is an example, and can be appropriately changed without departing from the gist of the invention. Further, the storage batteries 42 and 52 and the heat accumulator 50 are provided with the storage battery control portions 44 and 54 and the heat accumulator control portion 48 respectively, and are controlled thereby respectively. However, the storage batteries 42 and 52 and the heat accumulator 50 may be directly controlled by the integration control portion 60.

It should be noted that although the example in which the smart meter 10 endowed with the function of measuring power consumption and communicating with the information center 80 is provided has been described in the foregoing embodiment of the invention, the invention should not be limited to this example. For example, it is also appropriate to adopt a configuration in which the smart meter 10 is dispensed with, by, for example, replacing the smart meter 10 with a common power meter provided at a position of the smart meter 10, endowing the distribution board 8 with the function of measuring power consumption as one of the functions of the smart meter 10, and causing the integration control portion 60 to perform the function of communicating with the information center 80.

It is implied in the foregoing embodiment of the invention that the target value indicated by the power consumption target information may differ depending on the time zone. This time zone may be determined by the unit price of the power supplied from the telegraphic pole 5. For example, the target value may be set such that the charge of the storage battery 42, the accumulation of heat in the heat accumulator 50, and the like is carried out mainly in a time zone in which the unit price of power is low.

In the foregoing embodiment of the invention, the heat accumulator 50 may accumulate heat therein for the purpose of not only supplying hot water or heating but also meeting a demand for cold energy such as cooling or the like.

The invention claimed is:

1. An energy management system comprising:
   a plurality of storage batteries;
   a recording portion in which power consumption target information indicating a target value in consuming a power supplied by a supply portion that supplies a building with power is recorded;
   a detection portion that detects a current power consumption in the building;
   an integration control portion that performs control to charge the storage batteries with a power of such an amount that the power consumed that is supplied from the supply portion is equal to or smaller than the target value when the power consumption detected by the detection portion is smaller than the target value indicated by the power consumption target information recorded in the recording portion, and to supply the building with the power with which the storage batteries are charged such that the power consumed that is supplied from the supply portion is equal to or smaller than the target value when the power consumption detected by the detection portion is larger than the target value indicated by the power consumption target information recorded in the recording portion; and
   a plurality of storage battery control portions that control charge and discharge of said plurality of storage batteries respectively, wherein
   each of the storage battery control portions controls charge and discharge of a corresponding one of the storage batteries in accordance with a command issued by the integration control portion;
   the integration control portion determines in advance ranks of the storage batteries intended for discharge in causing the storage batteries to discharge power, and determines, in accordance with the amount of the power supplied to the building and the ranks, those storage batteries intended for discharge;
   the storage batteries are either stationary storage batteries arranged in or close to the building or mobile storage batteries provided in a vehicle to be used to cause the vehicle to run;
   the vehicle is a vehicle that runs without problem even when no power is stored in the storage battery; and
   the rank of the mobile storage battery corresponds to earlier discharge than the rank of the stationary storage battery.

2. The energy management system according to claim 1, wherein
   each of the storage battery control portions controls discharge of a corresponding one of the storage batteries such that a power discharged therefrom becomes equal to or smaller than a predetermined amount of power.

3. The energy management system according to claim 2, wherein
the predetermined amount of power is specified by the integration control portion.

4. The energy management system according to claim 1, wherein
the integration control portion causes each of the storage batteries intended for discharge to discharge power such that a predetermined amount of a stored power needed to cause the vehicle to run is left, when that storage battery intended for discharge is provided in the vehicle.

5. The energy management system according to claim 4, wherein
the predetermined amount of the stored power is determined in accordance with the vehicle.

6. The energy management system according to claim 1, further comprising
a setting portion that sets the target value, wherein
the setting portion sets a target value indicated by a power supplier where the supply portion supplies the building with power, or a target value input by a user.

7. The energy management system according to claim 6, wherein
the target value is set on a basis of a unit price of the power supplied from the supply portion.

8. The energy management system according to claim 1, further comprising
a heat accumulation portion that generates heat through power and accumulates the generated heat, wherein
the integration control portion performs control to supply the heat accumulation portion with a power of such an amount that the power consumption including the power supplied by the supply portion is equal to or smaller than the target value, when the power consumption detected by the detection portion is smaller than the target value indicated by the power consumption target information recorded in the recording portion.

9. The energy management system according to claim 1, further comprising
a power generation portion that generates a power in the building to supply the building with the power as well as the power supplied by the supply portion.

10. The energy management system according to claim 9, wherein
the integration control portion controls the power used to charge each of the storage batteries such that higher priority is given to the power supplied by the power generation portion than to the power supplied by the supply portion.

11. The energy management system according to claim 1, wherein
the integration control portion performs control to sell the power with which each of the storage batteries is charged.

12. A method of controlling an energy management system equipped with a plurality of storage batteries and a supply portion that supplies a building with power, comprising:
recording power consumption target information indicating a target value in consuming a power supplied from the supply portion;
detecting a power consumption in the building;
performing control to charge the storage battier with a power of such an amount that the power consumed that is supplied from the supply portion is equal to or smaller than the target value, when the detected power consumption is smaller than the target value indicated by the recorded power consumption target information;
performing control to supply the building with the power with which the storage batteries are charged such that the power consumed that is supplied from the supply portion is equal to or smaller than the target value, when the detected power consumption is larger than the target value indicated by the recorded power consumption target information; and
controlling charge and discharge of said plurality of storage batteries respectively, wherein
charge and discharge of each of said storage batteries is controlled in accordance with the controls performed to charge the storage batteries or to supply the building with power;
determining in advance ranks of the storage batteries intended for discharge in causing the storage batteries to discharge power and
determining, in accordance with the amount of the power supplied to the building and the ranks, those storage batteries intended for discharge; wherein
the storage batteries are either stationary storage batteries arranged in or close to the building or mobile storage batteries provided in a vehicle to be used to cause the vehicle to run;
the vehicle is a vehicle that runs without problem even when no power is stored in the storage battery; and
the rank of the mobile storage battery corresponds to earlier discharge than the rank of the stationary storage battery.

* * * * *